(12) United States Patent
Vu et al.

(10) Patent No.: US 11,035,458 B2
(45) Date of Patent: Jun. 15, 2021

(54) DECELERATION DEVICE

(71) Applicant: Nidec Corporation, Kyoto (JP)

(72) Inventors: Ha Hai Vu, Taipei (TW); Chien Yu Chen, Taipei (TW)

(73) Assignee: NIDEC CORPORATION, Kyoto (JP)

( * ) Notice: Subject to any disclaimer, the term of this patent is extended or adjusted under 35 U.S.C. 154(b) by 26 days.

(21) Appl. No.: 16/541,204

(22) Filed: Aug. 15, 2019

(65) Prior Publication Data

US 2020/0088290 A1 Mar. 19, 2020

(30) Foreign Application Priority Data

Sep. 13, 2018 (CN) .......................... 201821494469.5

(51) Int. Cl.
*F16H 57/04* (2010.01)
*H02K 7/116* (2006.01)

(52) U.S. Cl.
CPC ..... *F16H 57/0486* (2013.01); *F16H 57/0419* (2013.01); *H02K 7/116* (2013.01)

(58) Field of Classification Search
CPC . F16H 57/0486; F16H 57/0419; H02K 7/116; H02K 9/22
See application file for complete search history.

(56) References Cited

U.S. PATENT DOCUMENTS 6,104,112 A * 8/2000 Vanjani ................. H02K 11/33
310/64

FOREIGN PATENT DOCUMENTS

| CA | 2988922 A1 * | 7/2018 | ............. H02K 21/24 |
|---|---|---|---|
| DE | 19622486 C1 * | 10/1997 | ......... A61B 17/1624 |
| JP | 2004-320879 A | 11/2004 | |

* cited by examiner

*Primary Examiner* — Justin Holmes
(74) *Attorney, Agent, or Firm* — Keating & Bennett

(57) ABSTRACT

A deceleration device includes a reduction assembly that reduces speed, a motor attached to the reduction assembly, the motor being rotatable about a central axis line, and a heat insulator having a heat conduction coefficient of about 0.04 W/mK or less, the heat insulator being positioned between the motor and the reduction assembly. A surface temperature of an exposed portion of the motor is maintained at a low level, with a simple structure, that prevents burns to human skin in contact with the motor.

10 Claims, 3 Drawing Sheets

DECELERATION DEVICE

CROSS REFERENCE TO RELATED APPLICATION

The present invention claims priority under 35 U.S.C. § 119 to Chinese Application No. 201821494469.5 filed on Sep. 13, 2018, the entire contents of which are hereby incorporated herein by reference.

1. FIELD OF THE INVENTION

The present disclosure relates to a technique of reducing a temperature of a reduction gear motor and, particularly, relates to a deceleration device.

2. BACKGROUND

A reduction gear motor is a motor to which a reduction gear has been attached. Since the motor is attached to the reduction gear, the heat of the reduction gear is transmitted to the motor and the temperature of the motor increases.

In the known art, in order to prevent a high temperature of the reduction gear motor from reaching the reduction gear, a heat dissipation sheet is attached to a system configured of the reduction gear motor and the reduction gear to dissipate the heat of the reduction gear motor.

It should be noted that the introduction of the technical background described above is merely provided so that understanding of those skilled in the art is facilitated while attempting to conveniently give a clear and complete description of the technical proposal of the present disclosure. One should not acknowledge that the technical plans described above are known to those skilled in the art just because the plans are described in the portion of the background art of the present disclosure.

SUMMARY

The inventor has discovered that by attaching the heat dissipation sheet to the system described above, the system configuration becomes more complex and development and manufacturing costs become high. Furthermore, in a case in which a reduction gear and a reduction gear motor are used in a piece of equipment (a medical appliance, for example), when an exposed portion of the reduction gear motor (a rear cover of the motor, for example) comes in contact with a human body during operation of the equipment, and when the surface temperature of such an exposed portion of the motor reaches about 50° C., the skin of the human body in contact with the exposed portion may be burned.

In order to overcome the above issues, example embodiments of the present disclosure provide deceleration devices each including a heat insulating member having a heat conduction coefficient of about 0.04 W/mK provided between a motor and a reduction assembly so that a surface temperature of an exposed portion of the motor portion is able to be maintained at a low level, with a simple structure, that prevents the skin of the human body in contact with the motor portion from being burned.

According to a first aspect of the disclosure, provided is a deceleration device including a reduction assembly that reduces speed, a motor portion attached to the reduction assembly, the motor portion rotating about a central axis line, and a heat insulating member having a heat conduction coefficient of 0.04 W/mK or less, the heat insulating member being positioned between the motor portion and the reduction assembly.

The example embodiments of the present disclosure are disclosed in detail with the description described later and by referring to the accompanying drawings. It should be understood that the example embodiments of the present disclosure are not limited to the scope of the claims. The example embodiments of the present disclosure include various changes, modifications, and equivalents within the spirit of the appended claims and within the scope of the claims.

The features described and/or illustrated in one example embodiment may be used in one or more other example embodiments in a similar or in a resembling manner, and may be combined with the other example embodiments or the feature of the other example embodiments may be switched.

It should be noted that the technical terms "including/containing/provided with/" are used in the present document to illustrate the presence of a feature, a body portion, or a member; however, an addition of the presence of one or more of the other features, body parts, or members is not excluded.

The above and other elements, features, steps, characteristics and advantages of the present disclosure will become more apparent from the following detailed description of the example embodiments with reference to the attached drawings.

BRIEF DESCRIPTION OF THE DRAWINGS

The accompanying drawings are provided to further facilitate understanding of the example embodiments of the present disclosure and constitute a part of the specification. The accompanying drawings illustrate example embodiments of the present disclosure and, together with the written text, describes the principles of the present disclosure. The attached drawings described later are merely a few examples of the present disclosure. The attached drawings are as follows.

DETAILED DESCRIPTION

Figure 1:
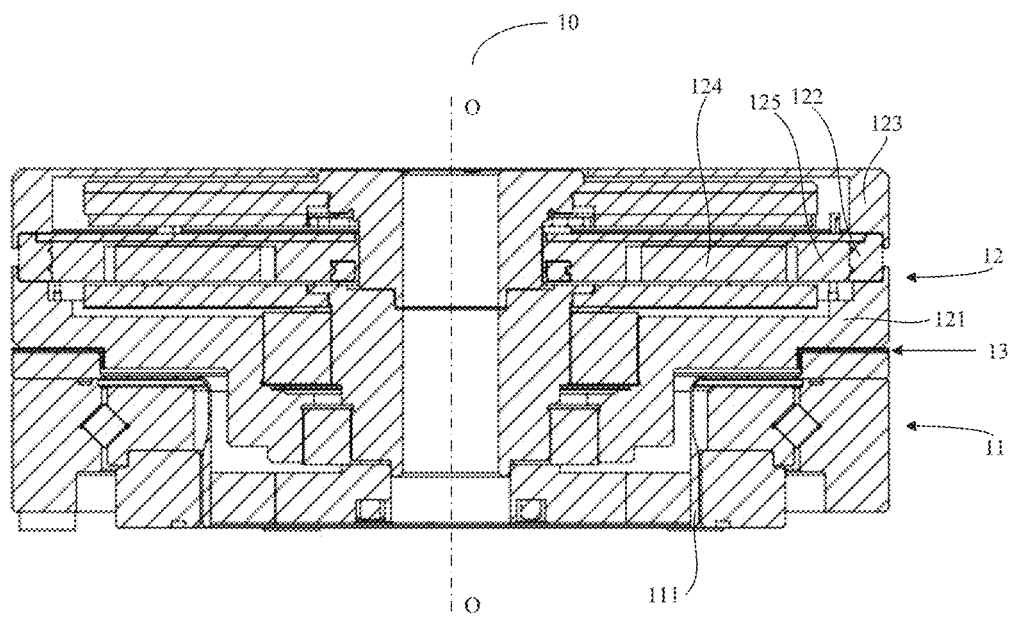
FIG. 1 is a schematic diagram of a deceleration device according to a first example embodiment of the present disclosure.

Referring to the drawings and with the specification described below, the features described above and other features of the disclosure will be made more clear. In the specification and the accompanying drawings, specific example embodiments of the present disclosure are disclosed in a specific manner and some of the example embodiments in which the principles of the present disclosure can be used are illustrated. However, it should be understood that the present disclosure is not limited by the described example embodiments and all various amendments, modifications, and equivalents within the scope of the accompanying claims are included.

In the example embodiments of the present disclosure, terms such as a "first" and a "second" are used to distinguish different elements from each other through designations; however, the terms do not denote the spatial arrangements and temporal orders of the elements, and the elements are not limited by the terms. The term "and/or" includes a single or a plurality of and any or all combinations of the elements that have been associated with the term "and/or".

In the example embodiments of the present disclosure, terms indicating a single form such as "a", "an", and "the" include a plural form and should be understood in a broad sense as "one type of" or "one kind of" and is not limited to meaning "a single". Furthermore, the term "the" should be understood as including both a singular form and a plural form unless described differently in the sentences above or below. Furthermore, the term "in accordance with" should be understood as "at least a portion of the . . . is in accordance with" unless described differently in the sentences above or below, and the term "based on" should be understood as "at least a portion of the is based on" unless described differently in the sentences above or below.

In the following description of the present disclosure, for the sake of description, a central line which a rotation portion of a motor can rotate about is referred to as a "central axis line", a direction extending in the same direction or a direction parallel to a direction extending along the central axis line is referred to as an "axial direction", a radial direction about the central axis line is referred to as a "radial direction", and a circumferential direction about the central axis line is referred to as a "circumferential direction".

Hereinafter, a description of the example embodiments of the present disclosure will be given while referring to the accompanying drawings.

First Example Embodiment

Figure 2:
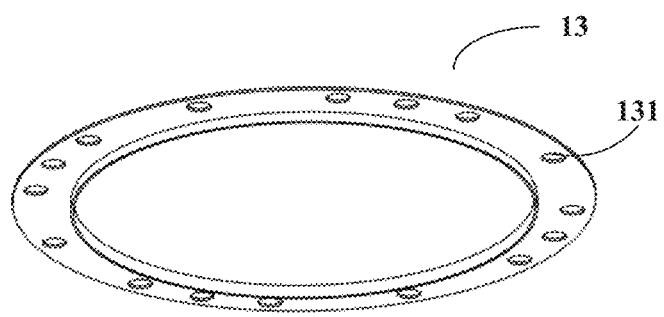
FIG. 2 is a schematic diagram of a heat insulating member in the deceleration device according to the first example embodiment of the present disclosure.

A first example embodiment provides a deceleration device. FIG. 1 is a cross-sectional view taken in an axial direction of a deceleration device of the present example embodiment. FIG. 2 is a single view drawing of a heat insulating member in the deceleration device of the present example embodiment.

As illustrated in FIGS. 1 and 2, the deceleration device 10 includes a reduction assembly 11 that reduces speed and a motor portion 12 attached to the reduction assembly 11. The motor portion 12 rotates about a central axis line O-O. The deceleration device 10 further includes a heat insulating member 13 having a heat conduction coefficient of 0.04 watt/meter-kelvin (W/mK) or less. The heat insulating member 13 is located between the motor portion 12 and the reduction assembly 11. Considering clarity, reference numerals are attached only to the members on the right side in the cross-sectional view in FIG. 1 and reference numerals on the left side are omitted.

In the example embodiment described above, the heat insulating member 13 having a heat conduction coefficient of 0.04 W/mK or less is provided between the motor portion 12 and the reduction assembly 11. Accordingly, since the heat conduction coefficient of the heat insulating member is small, the heat generated in the reduction assembly 11 is shut off by the heat insulating member 13, and the heat transmitted from the reduction assembly 11 to the motor portion 12 is also considerably small. With the above, a surface temperature of an exposed portion of the motor portion 12 can be maintained at a low level, with a simple structure, that prevents the skin of the human body in contact with the motor portion 12 from getting burnt.

In the present example embodiment, the heat insulating member may be formed of at least either one of fiber, resin, and polystyrene foam. With the above, the heat conduction coefficient confirming to the requirement described above is provided. However, the present example embodiment is not limited to the above and the heat insulating member may be formed of an appropriate material or appropriate materials different from the above.

Technical effects that can be obtained with the deceleration device will be described in detail with the deceleration device illustrated in FIG. 1 in which the motor portion 12 is, as an example, an axial flux motor. However, not limited to the present example embodiment, the motor portion 12 may be a radial flux motor as described in second and third example embodiments described later. Furthermore, both the motor portion and the reduction assembly in the deceleration device may adopt other structures of the known art.

For example, as illustrated in FIG. 1, the motor portion 12 may include a front cover 121 disposed on a first side of the motor portion 12 in the axial direction, a stator cover 122 on an outer side in a radial direction that covers a stator, the stator including windings 124, a resin 125 filled between the windings 124 and the stator cover 122, and a rear cover 123 disposed on a second side of the motor portion 12 in the axial direction. The reduction assembly 11 may include a gear 111. Note that the rear cover 123 is a portion of the motor portion exposed to the outside, in other words, the rear cover 123 is a portion that may come in contact with the human body.

When the heat insulating member 13 is not provided in the deceleration device, the temperature of the motor becomes substantially high due to the heat, which is generated by contact loss occurring in the reduction assembly 11 during deceleration, being transmitted from the gear 111 to the rear cover 123 through the front cover 121, the stator cover 122, and the resin 125.

In the example embodiment illustrated in FIG. 1, since the heat insulating member 13 is disposed between the reduction assembly 11 and the front cover 121 of the motor portion 12, the heat generated by contact loss that has occurred in the reduction assembly 11 during deceleration is transmitted to the heat insulating member 13 from the gear 111. Since the heat conduction coefficient of the heat insulating member 13 is 0.04 W/mK or less, the heat transmitted to the rear cover 123 from the gear 111 can be reduced substantially. Furthermore, the temperature of the surface of the rear cover 123 can be reduced to 45° C. or lower and, accordingly, when the user contacts the portion of the motor portion 12 exposed to the outside, the user does not get burnt. Moreover, the heat transmitted from the gear 111 to the windings 124 through the front cover 121, the stator cover 122, and the resin 125 can be substantially reduced as well, and the temperature of the windings 124 can be reduced and wear on the windings 124 can be reduced.

In the present example embodiment, a thickness of the heat insulating member 13 in the axial direction can be set to any thickness. For example, the thickness may be set smaller than a predetermined value (5 mm, for example). In an axial flux motor, the motor is compact in size; accordingly, a cooling member such as a heat dissipation sheet that needs increased space in order to be attached cannot be attached to the axial flux motor. In the present example embodiment, since the heat insulating member 13 is provided at a position between the motor portion 12 and the reduction assembly 11, the space does not need to be increased intentionally in order to dispose the heat insulating member 13. When the thickness of the heat insulating member 13 is small, the occupied space will be small; accordingly, the heat insulating member 13 can be applied to a compact-sized structure such as the axial flux motor.

In the present example embodiment, an outer diameter of the heat insulating member 13 can be equivalent to or smaller than an outer diameter of the motor portion 12. With the above, the heat insulating member 13 can be prevented from occupying an unnecessary space and the thickness of the deceleration device in the axial direction can be reduced.

In the present example embodiment, when viewed in the axial direction, a ratio of an area of the heat insulating member 13 to an area in which the reduction assembly 11 and the motor portion 12 oppose each other in the axial direction may be set within an appropriate range. The area ratio described above may be set based on the heat conduction coefficient of the heat insulating member 13. For example, the area ratio may be set to at least 30%. The heat insulating effect is obtained with the above area ratio.

In the present example embodiment, the heat insulating member 13 can be of any shape. For example, the heat insulating member 13 may have an annular shape illustrated in FIG. 1, or may have another shape such as a polygonal shape.

As illustrated in FIG. 2, in the present example embodiment, at least two hole portions 131 may be provided in the heat insulating member 13 to attach the heat insulating member 13 to the motor portion 12 and/or the reduction assembly 11 with screws or the like. Each hole portions 131 may have a round shape or may have another shape suitable for the attachment.

In the present example embodiment, a heat insulating material may be applied to an outer surface of the heat insulating member 13. The heat insulating effect can be improved further with the above. The heat insulating material described above may be yttrium oxide stabilized zirconia (YSZ), for example. However, not limited to the present example embodiment, another suitable heat insulating material may be used.

In the present example embodiment, the reduction assembly 11 may include a group of gears configured of a single type or a plurality of types of gears. For example, the group of gears may include at least one of an annular gear, a planetary gear, and a sun gear.

In the present example embodiment, the heat insulating member 13 having a heat conduction coefficient of 0.04 W/mK or less is provided between the motor portion and the reduction assembly. Accordingly, since the heat conduction coefficient of the heat insulating member is small, the heat generated in the reduction assembly is shut off by the heat insulating member, and the heat transmitted from the reduction assembly to the motor portion is also considerably small. With the above, the surface temperature of the exposed portion of the motor portion can be maintained at a low level, with a simple structure, that prevents the skin of the human body in contact with the motor portion from getting burnt.

Second Example Embodiment

Figure 3:
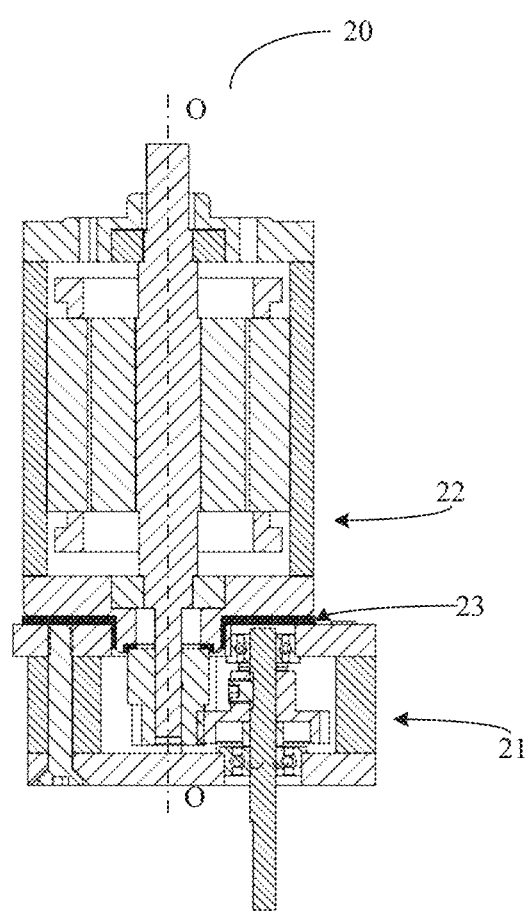
FIG. 3 is a schematic diagram of a deceleration device according to a second example embodiment of the present disclosure.

A second example embodiment provides a deceleration device. FIG. 3 is a cross-sectional view taken in an axial direction of a deceleration device of the present example embodiment.

As illustrated in FIG. 3, the deceleration device 20 includes a reduction assembly 21 that reduces speed and a motor portion 22 attached to the reduction assembly 21. The motor portion 22 rotates about a central axis line O-O. The deceleration device 20 further includes a heat insulating member 23 having a heat conduction coefficient of 0.04 watt/meter-kelvin (W/mK) or less. The heat insulating member 23 is located between the motor portion 22 and the reduction assembly 21. Different from the first example embodiment, the motor portion 22 is a radial flux motor in the deceleration device according to the present example embodiment.

In the above, the heat insulating member 23 may be, for example, the heat insulating member 13 according to the first example embodiment; accordingly, description of the heat insulating member 23 is omitted herein.

In the present example embodiment, the heat insulating member 13 having a heat conduction coefficient of 0.04 W/mK or less is provided between the motor portion and the reduction assembly. Accordingly, since the heat conduction coefficient of the heat insulating member is small, the heat generated in the reduction assembly is shut off by the heat insulating member, and the heat transmitted from the reduction assembly to the motor portion is also considerably small. With the above, the surface temperature of the exposed portion of the motor portion can be maintained at a low level, with a simple structure, that prevents the skin of the human body in contact with the motor portion from getting burnt.

Third Example Embodiment

Figure 4:
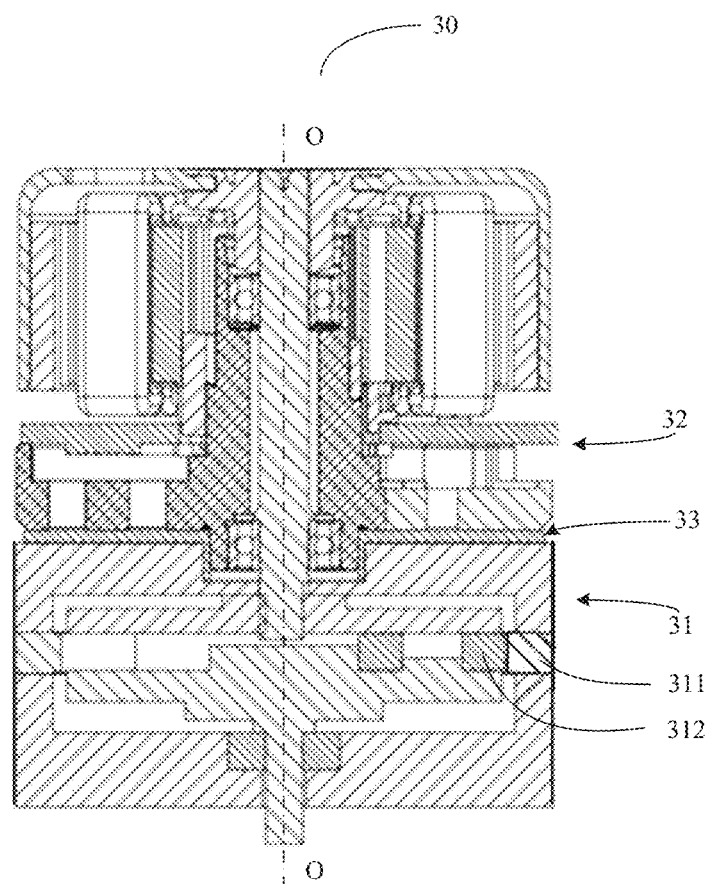
FIG. 4 is a schematic diagram of a deceleration device according to a third example embodiment of the present disclosure.

A third example embodiment provides a deceleration device. FIG. 4 is a cross-sectional view taken in an axial direction of a deceleration device of the present example embodiment. As illustrated in FIG. 4, the deceleration device 30 includes a reduction assembly 31 that reduces speed and a motor portion 32 attached to the reduction assembly 31. The motor portion 32 rotates about a central axis line O-O. The deceleration device 30 further includes a heat insulating member 33 having a heat conduction coefficient of 0.04 watt/meter-kelvin (W/mK) or less. The heat insulating member 33 is located between the motor portion 32 and the reduction assembly 31. In the deceleration device according to the present example embodiment, the motor portion 32 is a radial flux motor and, different from the first and second example embodiments, a structure in which a planetary gear 312 and an internal gear 311 are meshed with each other is used in the reduction assembly 31.

In the present example embodiment, the heat insulating member 13 having a heat conduction coefficient of 0.04 W/mK or less is provided between the motor portion and the reduction assembly. Accordingly, since the heat conduction coefficient of the heat insulating member is small, the heat generated in the reduction assembly is shut off by the heat insulating member, and the heat transmitted from the reduction assembly to the motor portion is also considerably small. With the above, the surface temperature of the exposed portion of the motor portion can be maintained at a low level, with a simple structure, that prevents the skin of the human body in contact with the motor portion from getting burnt.

Referring to the accompanying drawings, the example embodiments of the present disclosure have been described above in detail, and systems in which the principle of the present disclosure can be used have been explicitly described. However, it is to be understood that the implementation of the present disclosure is not limited to the systems according to the example embodiments described above, and the present disclosure further includes all modifications, revisions, and equivalents that are within the scope of the present disclosure.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A deceleration device comprising:
   a reduction assembly that reduces speed;
   a motor attached to the reduction assembly and rotatable about a central axis line; and
   a heat insulator having a heat conduction coefficient of about 0.04 W/mK or less and being positioned between the motor and the reduction assembly; wherein
   at least two hoes are provided in the heat insulator.

2. The deceleration device according to claim 1, wherein the motor is an axial flux motor.

3. The deceleration device according to claim 1, wherein a thickness of the heat insulator is smaller than about 5 mm.

4. The deceleration device according to claim 1, wherein an outer diameter of the heat insulator is equivalent to or smaller than an outer diameter of the motor.

5. The deceleration device according to claim 1, wherein when viewed in an axial direction, an area of the heat insulator is at least about 30% of an area of a portion where the reduction assembly and the motor oppose each other in the axial direction.

6. The deceleration device according to claim 1, wherein the heat insulator is made of at least either one of fiber, resin, and polystyrene foam.

7. The deceleration device according to claim 1, wherein the heat insulator has an annular shape or a polygonal shape.

8. The deceleration device according to claim 1, wherein the reduction assembly includes at least one of an annular gear, a planetary gear, and a sun gear.

9. A deceleration device according to claim 1, wherein a heat insulating material is applied to an outer surface of the heat insulator.

10. The deceleration device according to claim 1, wherein the at least two holes each have a round shape.

* * * * *